US 7,786,877 B2

(12) United States Patent
Hou (10) Patent No.: US 7,786,877 B2
(45) Date of Patent: Aug. 31, 2010

(54) MULTI-WAVELENGTH VIDEO IMAGE FIRE DETECTING SYSTEM

(76) Inventor: Billy Hou, 9/F., No. 292, Chengte Rd., Sec. 7, Peitou Dist., Taipei City (TW)

( * ) Notice: Subject to any disclaimer, the term of this patent is extended or adjusted under 35 U.S.C. 154(b) by 256 days.

(21) Appl. No.: 12/213,496

(22) Filed: Jun. 20, 2008

(65) Prior Publication Data
US 2009/0315722 A1 Dec. 24, 2009

(51) Int. Cl.
*G08B 17/12* (2006.01)
(52) U.S. Cl. ...................................... 340/578
(58) Field of Classification Search ................ 340/578, 340/506, 577, 628, 632; 382/100, 203; 250/339.15
See application file for complete search history.

(56) References Cited
U.S. PATENT DOCUMENTS

| | | | | |
|---|---|---|---|---|
| 5,153,722 | A * | 10/1992 | Goedeke et al. ............. | 348/159 |
| 6,184,792 | B1 * | 2/2001 | Privalov et al. ............. | 340/578 |
| 6,937,743 | B2 * | 8/2005 | Rizzotti et al. ............. | 382/100 |
| 7,154,400 | B2 * | 12/2006 | Owrutsky et al. ........... | 340/578 |
| 7,289,032 | B2 * | 10/2007 | Seguin et al. ............... | 340/578 |
| 7,680,297 | B2 * | 3/2010 | Privalov ..................... | 382/100 |
| 2003/0044042 | A1 * | 3/2003 | King et al. .................. | 382/100 |
| 2003/0132847 | A1 * | 7/2003 | Anderson .................... | 340/578 |

* cited by examiner

*Primary Examiner*—Phung Nguyen
(74) *Attorney, Agent, or Firm*—Rosenberg, Klein & Lee (57) ABSTRACT

To eliminate the drawbacks of false alarm problems due to mimic flame features of sunlight or moonlight reflecting on wave or mimic flame features of fabrics, animals or stage flames and alarm failures of methanol or ethanol burning flames or flames under a high illumination background condition, a multi-wavelength video image fire detecting system is disclosed consisting of a multi-wavelength video image fire detector, which is comprised of a color and near IR dual-mode camera, a color and B/W dual-mode camera, an image capture module, a processor and controller, an I/O module, a housing and a visible light and near IR view window, an alarm and indicate equipment, a setting and debugging system, a communication equipment, an area alarm and monitor system, and a pan & title and control system.

20 Claims, 8 Drawing Sheets

MULTI-WAVELENGTH VIDEO IMAGE FIRE DETECTING SYSTEM

BACKGROUND OF THE INVENTION

1. Field of the Invention

The present invention relates to fire detection system and more particularly, to a multi-wavelength video image fire detecting system comprised of a multi-wavelength video image fire detector, an alarm and indicate equipment, a setting and debugging system, a communication equipment, an area alarm and monitor system, and a pan & title and control system, wherein the multi-wavelength video image fire detector is comprised of a color and near IR dual-mode camera, a color and B/W dual-mode camera, an image capture module, a processor and controller, an I/O module, a housing and a visible light and near IR view window. The system integrates multi-wavelength smoke and flame detection algorithms and fire data fusion algorithm, satisfying different fire detection requirements under different illumination conditions.

2. Description of the Related Art

Following fast and continuous establishment of industrial, business and home buildings, the number fire accident cases is increased. In recent years, due to significant change of global weather, forest fire reports are frequently heard, bringing catastrophes to people. Many fire detection and alarm systems have been created for fire protection. However, conventional detectors for fire protection have a delayed response problem. For example, there is a time delay before transmission of heat and smoke from the location of the fire to the thermal and smoke detectors. Even a satellite fire monitoring technique us employed, it can only detect a big area fire. Air sampling smoke detectors may be used to reduce delay in detection. However, these conventional air sampling smoke detectors cannot eliminate the problem of detection delay when used for a big area protection. Only the use of video-based flame and smoke detectors can eliminate detection delay problem and give an instant alarm.

U.S. Pat. No. 6,937,743 discloses a method for automatically detecting fires, based on flame and/or smoke recognition by analyzing a sequence of images. The analysis is based on several image processing algorithms. One algorithm consists in comparing the frequency content of at least an image of the sequence with the frequency content of a reference image so as to detect an attenuation of high frequencies independently of variations on other portions of the spectrum. U.S. Pat. No. 7,002,478 discloses a method of operating a computer for smoke and flame detection comprising the steps of: receiving digitized images of the region to be monitored; comparing pixels of one of the images with pixels of another image according to two predetermined procedures to produce a flame present decision and a smoke present decision; and providing a fire detected signal according to said smoke present and flame present decisions.

The aforesaid video image-based fire detection methods rely upon visible features of the fire, such as dimension, motion, transparency, continuity, and etc. These features are detectable by conventional video-based fire detection devices only they are under a visible environment or background. Obviously, there is a limitation. Any algorithm cannot achieve the expected result if the system cannot detect smoke and flame features under all different conditions.

The prior art fire detecting systems cannot detect a field fire where the color and light intensity of the background are similar to the fire. For example, conventional fire detecting systems cannot detect an alcohol fire transparent flame, an alcohol fire obstructed flame, a wind obstructed flame, a blue flame in a blue background, a grey smoke or smoke in a grey or dark background, or a flame in a moving vehicle. Conventional fire detecting systems may produce a false alarm upon detection of a mimic flame features such as sunlight or moonlight reflecting on a wave, a moving person wearing an orange sportswear, or tree leaves oscillating in the wind. Steam, controlled fire, or smoke-like cloud may cause a conventional fire detecting system to produce a false alarm.

Further, conventional fire detecting systems have other drawbacks. Many factors in a video camera system, including type of image sensor, focal distance of lens, aperture, and white balance affect image quality. When detecting a flame under a normal condition, small aperture and compensation are better to that a clear contour of the flame can be obtained. However, the detection of a smoke is different. Because a smoke is shown in a grey, black or dark tone, aperture and compensation values should be relatively greater. More particularly, when catching the image of a smoke at night, relatively greater aperture and compensation values are necessary. If a camera parameter is added to the control algorithm of a video image-based fire detecting system, the calculation will be complicated. Theoretically, using a camera system having a fixed spectrum characteristic cannot satisfy the requirements for concomitant flame and smoke detection and alarm.

A thermal imaging system may be used for fire detection. However, a thermal imaging system usually utilizes long wavelength or middle wavelength infrared sensors. These sensors have the drawback of high cost. A thermal imaging system shows better flame and overhead detection performance, however it cannot detect a smoke or blocked flame.

Conventional fire detecting systems still have a common problem, i.e., the problem of fixed field of view. Because variable field of view will complicate the algorithm and cause an alarm report delay, conventional fire detecting systems do not adopt variable field of view. However, for forest fire detection, variable field of view is requisite.

Therefore, it is desirable to provide a multi-wavelength video image fire detecting system that eliminates the aforesaid various drawbacks of the prior art designs.

SUMMARY OF THE INVENTION

The present invention has been accomplished under the circumstances in view. It is the main object of the present invention to provide a multi-wavelength video image fire detecting system, which effectively eliminates mimic flame and smoke features and effectively catch alcohol transparent and alcohol obstructed flame images and flame images under a high backlight environment, achieving early and reliable detection of a fire. The invention eliminates conventional indoor space fire detection problems as well as outdoor space fire detection problems, more particularly, forest fire detection problems.

It is another object of the present invention to provide a multi-wavelength video image fire detecting system, which is easily connectable to a conventional fire alarm system and a conventional CCTV video monitoring system, constituting an independent and complete local or remote fire alarm and monitoring system.

The multi-wavelength video image fire detecting system utilizes color and B/W dual-mode cameras and color and near IR dual-mode cameras to monitor predetermined areas. The color and near IR dual-mode camera utilizes a CCD or CMOS type image sensor of spectrum within 400 nm~1200 nm and a high-pass near IR filter of cut-off frequency 850 nm (or 950 nm and up), and is switchblade between a color mode and a near IR mode. The color and B/W dual-mode camera utilizes a CCD or CMOS type image sensor of spectrum within 400 nm~1200 nm, and is switchblade between a color mode when at daylight or under the radiation of light and a B/W mode when under a no light or weak light environment. The color and near IR dual-mode camera is adapted for picking up flame images under different illumination conditions and flame images of burning of alcohol-like fuel and substances and flicker images of a flame. The color and B/W dual-mode camera is adapted for catching clear fire smoke images and flicker images of a flame under different illumination conditions.

The multi-wavelength video image fire detecting system is comprised of a multi-wavelength video image fire detector, an alarm and indicate equipment, a setting and debugging system, a communication equipment, an area alarm and monitor system, and a pan & title and control system. The multi-wavelength video image fire detector is comprised of a color and near IR dual-mode camera, a color and B/W dual-mode camera, an image capture module, a processor and controller, an I/O module, a housing and a visible light and near IR view window. For use in a UAV (unmanned aerial vehicle) for forest fire detection, the processor and controller provides hovering and flying attitude adjustment controls.

The processor and controller of the multi-wavelength video image fire detecting system comprises a flame image recognition algorithm, a fire general probability algorithm a light source control algorithm, a pan control algorithm, a dual-mode camera switching control algorithm, and a fire positioning algorithm. Unlike conventional video image-based fire detecting systems, the flame image recognition algorithm performs a simultaneous or time-shared calculation on the two parallel image series (color, B/W, or near IR). The two calculation results are fused into a smoke occurrence probability. By means of same or different lens, aperture and compensation parameters, the use of color and near IR dual-mode cameras and color and B/W dual-mode cameras, the invention accurately cap all different images under complicated illumination conditions, avoiding background interference.

By means of the use of color and near IR dual-mode cameras and color and B/W dual-mode cameras, the invention accurately detects position of the fire and provides the coordinates information of the fire to the fire-extinguishing system.

When compared with conventional techniques, the invention has the following advantages:

1. The multi-wavelength video image fire detecting system of the invention adopts multi-wavelength images and different camera parameters for application under complicated and poor environment conditions, such as dark background, high light intensity background, sunlight-affected outdoor background, and etc., to effectively catch fire features for reliable alarm report.

2. The multi-wavelength video image fire detecting system of the invention effectively catches the images of alcohol fire transparent flame, alcohol fire obstructed flame, wind obstructed flame and tree blocked flame, obtaining clear smoke image information subject to background illumination condition for reliable fire detection.

3. The system algorithm of the present invention is quite simple. DSP parallel processor is employable to set up a completely and independently distributed intelligent fire detector for constituting a DSP-based distributed type multi-wavelength video image fire detecting system. It is compatible to regular CCTV video monitoring system for wide application.

DETAILED DESCRIPTION OF THE PREFERRED EMBODIMENT

Figure 1:
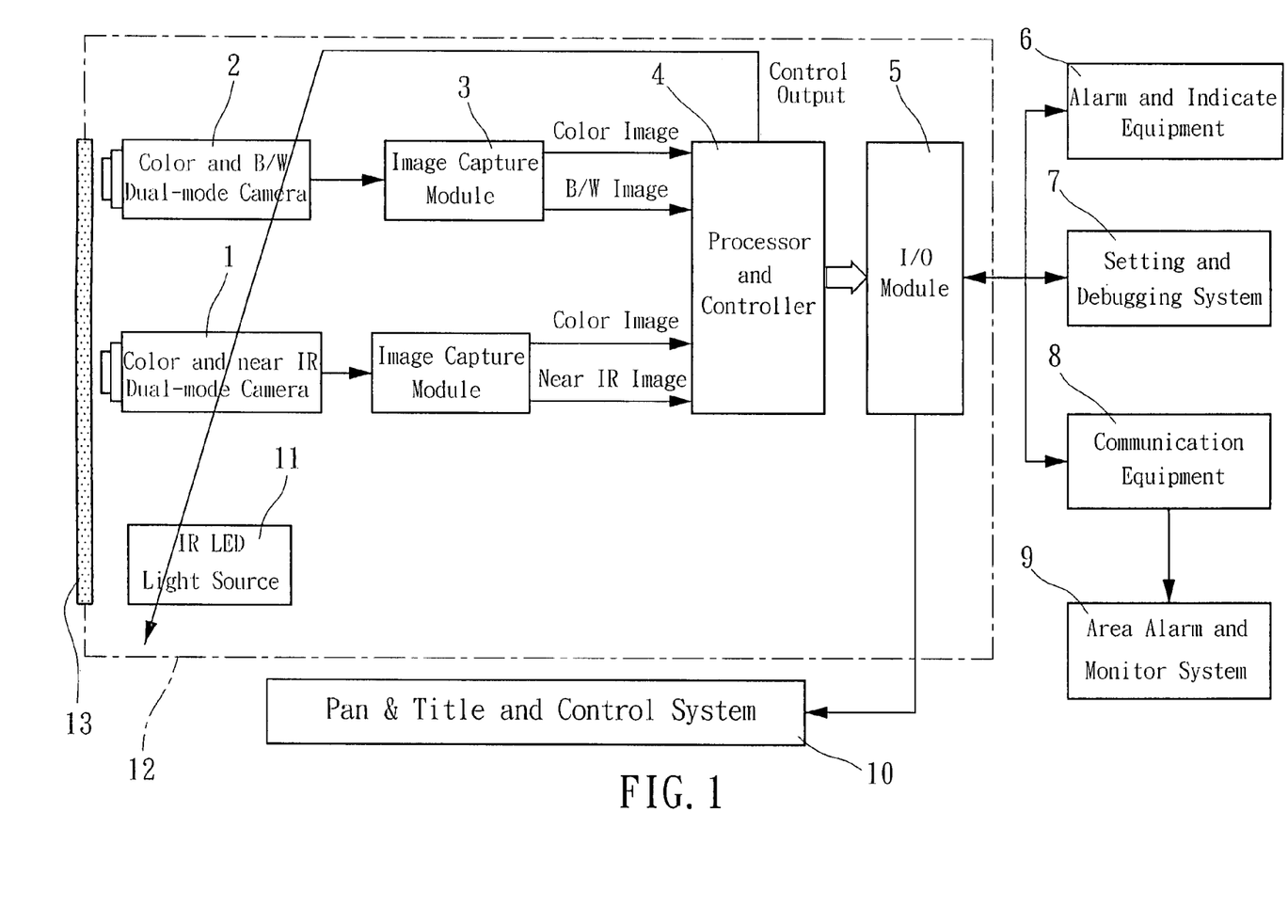
FIG. 1 is a system block diagram of a DSP-based distributed type multi-wavelength video image fire detecting system according to the present invention.

Referring to FIG. 1, a DSP-based distributed type multi-wavelength video image fire detecting system in accordance with the present invention is shown comprised of a multi-wavelength video image fire detector 12, an alarm and indicate equipment 6, a setting and debugging system 7, a communication equipment 8, an area alarm and monitor system 9, and a pan & title and control system 10. The multi-wavelength video image fire detector 12 is comprised of a color and near IR dual-mode camera 1, a color and B/W dual-mode camera 2, an image capture module 3, a processor and controller 4, an I/O module 5, a housing and a visible light and near IR view window 13. The multi-wavelength video image fire detector 12 utilizes color and near IR dual-mode camera and color and B/W dual-mode camera to obtain color B/W and near IR images under different environment conditions. PAL (Phase Alternating Line) format or NTSC (National Television System Committee) format may be selectively used. The color and near IR dual-mode camera 1 utilizes a CCD or CMOS type image sensor of spectrum within 400 nm~1200 nm, and a high-pass near IR filter of cut-off frequency 850 nm (or 950 nm and up). The color and near IR dual-mode camera 1 can be switched between color mode and near IR mode. The color and B/W dual-mode camera 2 utilizes a CCD or CMOS type image sensor of spectrum within 400 nm~1200 nm. Switch the color and B/W dual-mode camera 2 to the color mode when at daylight or under the radiation of light. When under a no light or weak light environment, switch the color and B/W dual-mode camera 2 to the B/W mode. The color and near IR dual-mode camera 1 is adapted for picking up flame images under different illumination conditions, avoiding influence of visible light. It is also used to pick up the flame images of burning of alcohol-like fuel or substances. The flames of alcohol-like fuel or substances show a blue or transparent color with less smoke. It is difficult to pick up the whole images of these flames with a conventional CCTV camera. Further, the flames of certain materials burned show a strip-like shape under the effect of wind, and the images of these flames obtained through a regular CCTV camera are not useful for image analysis. The color and near IR dual-mode camera 1 can catch the whole flame images. Matching with an near IR back light, the color and B/W dual-mode camera 2 can catch clear fire smoke images under any illumination conditions. When the light intensity is excessively high, start the color mode of the color and near IR dual-mode camera 1 at the same time to pick up clear smoke images. The B/W mode of the color and B/W dual-mode camera 2 and the near IR mode of the color and near IR dual-mode camera 1 can also be used to catch flicker images of a flame that is blocked by a fire smoke. A burning flame gives off visible light and infrared light. By means of background reflection, the two cameras cap catch reflective visible light and infrared light, thereby probing the fire where the main flame is blocked from sight.

The processor and controller 4 of the multi-wavelength video image fire detector 12 is a DSP embedded processing system. Other equivalent CPU module, for example, PC104 module may be used as a substitute. It is responsible for fire recognition, switching control of the two cameras, pan and tilt control as well as back light control. For use in a UAV (unmanned aerial vehicle) for forest fire detection, the module provides hovering and flying attitude adjustment controls. To a UAV video image fire protecting system, the major problem is the heavy vibration of the aerial vehicle during movement. Therefore, the images must rapidly reflect the basic characteristics of the fire. The dual-mode cameras of the present invention can rapidly catch the near infrared images of the fire and give flying attitude controls such as hovering, backward flying, and etc., so that the detecting system can catch more fire-related images for further analysis.

The image capture module 3 of the multi-wavelength video image fire detector 12 utilizes a specifically designed image capture chip, having an image signal filtering function.

The I/O module 5 of the multi-wavelength video image fire detector 12 comprises a power supply circuit, an input/output signal regulating circuit (pre-alarm, fire alarm, failure), a relay output circuit, RS232/458 and TCP/IP communication circuits and related interfaces.

The visible light and near IR view window 13 of the multi-wavelength video image fire detector 12 matches the cameras to catch clear images. It can be made of an organic or inorganic material through a cutting process.

The alarm and indicate equipment 6 are installed with the multi-wavelength video image fire detector 12 on site, using LEDs to indicate the information of pre-alarm, fire alarm, or failure. Further, the alarm and indicate equipment 6 comprises a fire alarm button and a failure button operable to give an analog fire alarm signal or a failure signal to the multi-wavelength video image fire detector 12. When the processor and controller 4 of the multi-wavelength video image fire detector 12 receives an analog signal from the fire alarm button or the failure button, it controls the relay or communication port to output a corresponding alarm information. This function is significant to system installation, test and maintenance.

The communication equipment 8 is for connection to a local or remote alarm monitoring system to upload the information of image, fire occurrence probability and alarm, and to receive control signals. The communication equipment 8 is capable of compressing and transmitting digital images subject to H264 international standard.

The area alarm and monitor system 9 can also be used as a central alarm and monitoring system, providing the following functions:

1. Monitor more than 32 detectors, and add the information of fire location and fire occurrence probability to the monitored video. It uses a GIS (geographic information system) to monitor a big area, to encode detector address, and to display information about detector installation area, fire occurrence probability, location of suspected area and alarm grade.

2. Establish a databank to manage and store all information and images of fire alarm area.

3. Run pan and tilt control on the detectors or cameras in the monitored area.

4. Run remote setting on detector parameters such as sensitivity, detection area and type.

5. Provide a secondary image fire recognition algorithm when necessary, raising system reliability.

Figure 2:
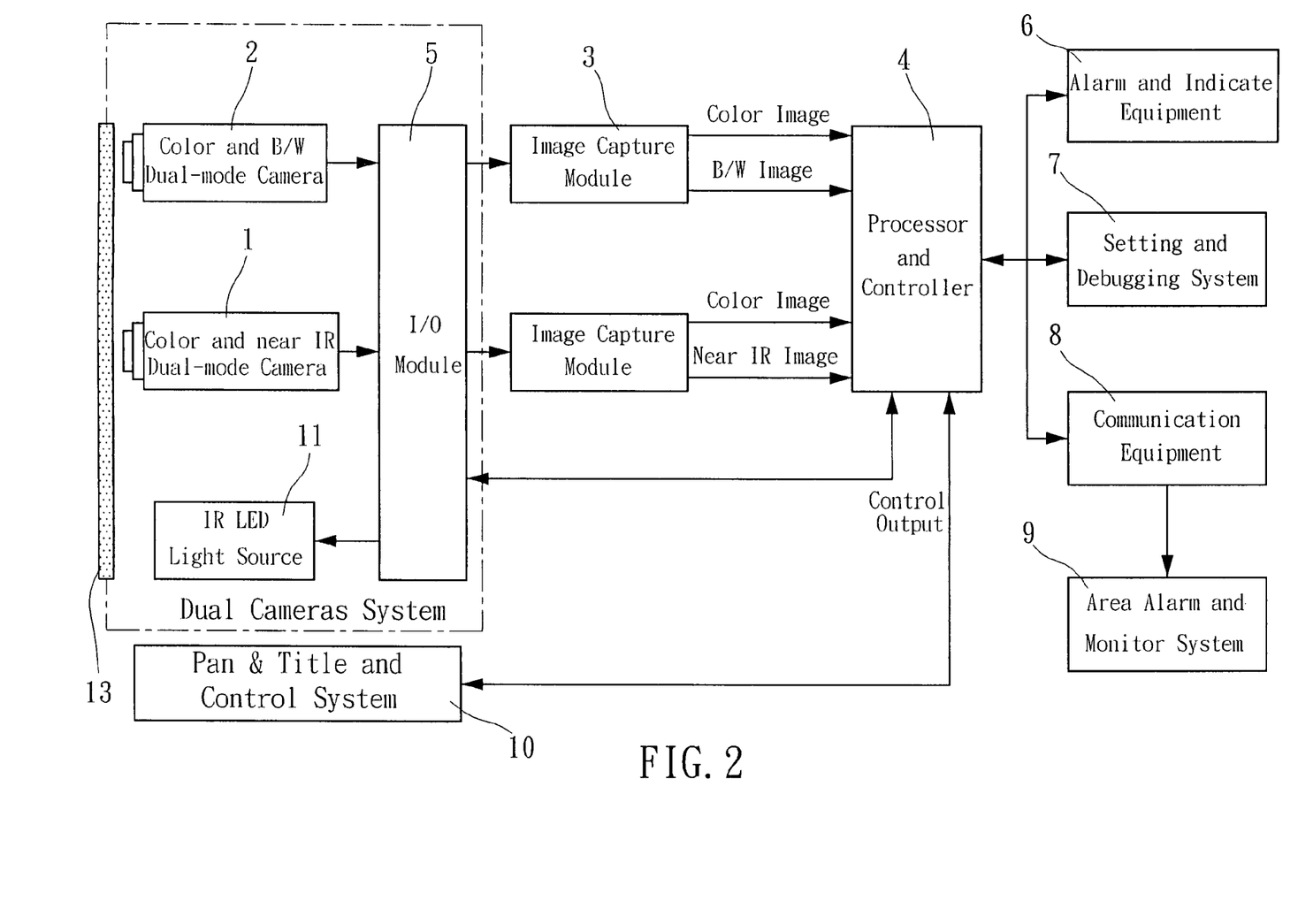
FIG. 2 is a system block diagram of a multi-wavelength video image fire detecting system based on an external computer or other processing system according to the present invention.

FIG. 2 is a system block diagram of a multi-wavelength video image fire detecting system based on an external computer or other processing system according to the present invention. Unlike the DSP-based distributed type multi-wavelength video image fire detecting system shown in FIG. 1, this embodiment utilizes an industrial control or other high-performance processor for signal processing and control. One signal processing and control device can be connected with more then 4 multi-wavelength dual-mode camera systems. Each multi-wavelength dual-mode camera system is, same as that shown in FIG. 1, comprised of one color and near IR dual-mode camera 1, one color and B/W dual-mode camera 2, an infrared light source 11, an I/O module 5, a housing and a view window 13. The performance of the image sensor is same as that shown in FIG. 1.

Figure 4A:
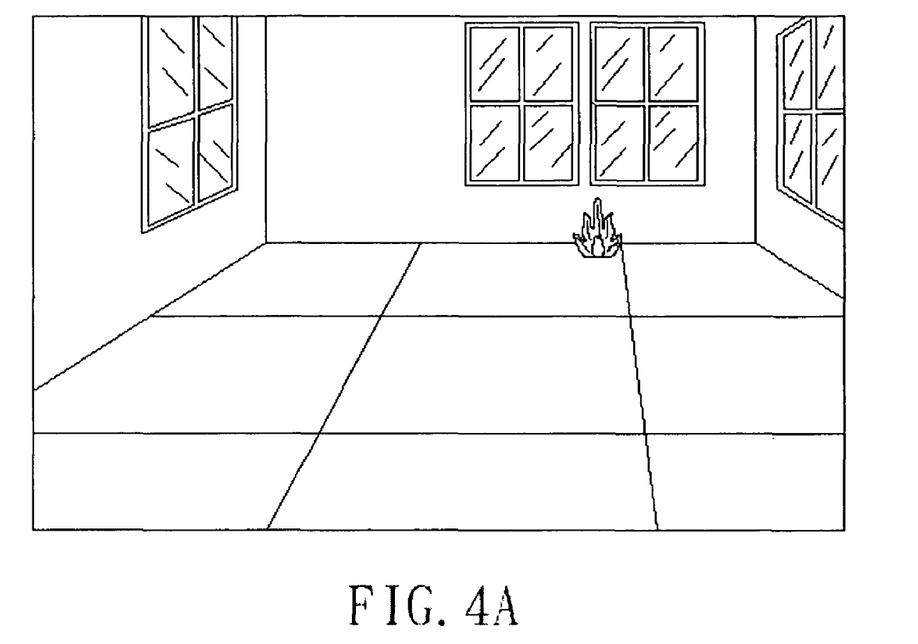
FIGS. 4A and 4B illustrate contrast between the picture of a B/W image and the picture of a near IR image obtained according to the present invention.
Figure 4B:
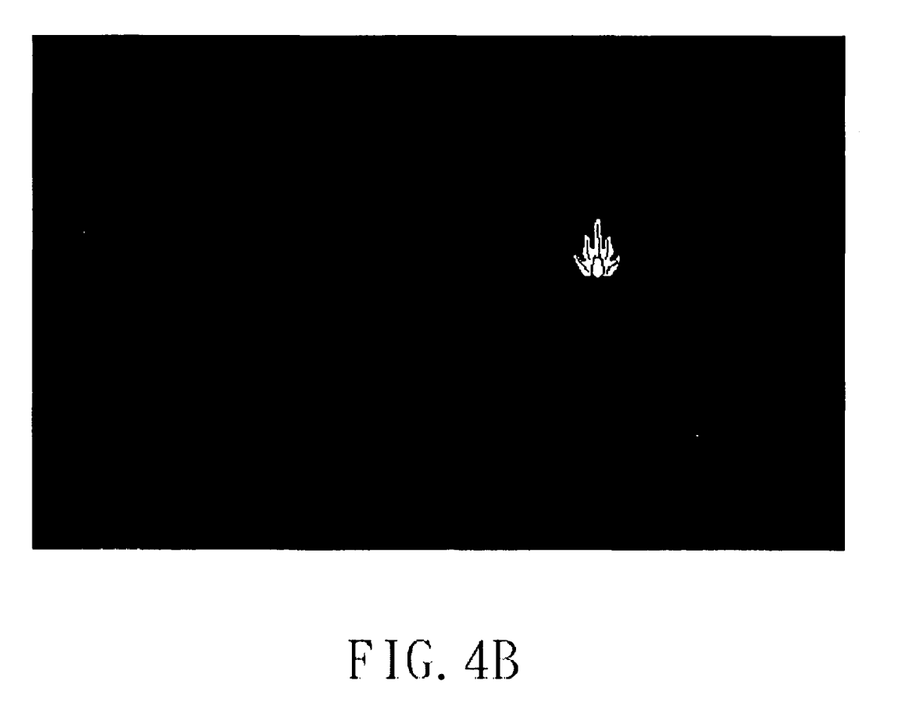
Figure 5A:
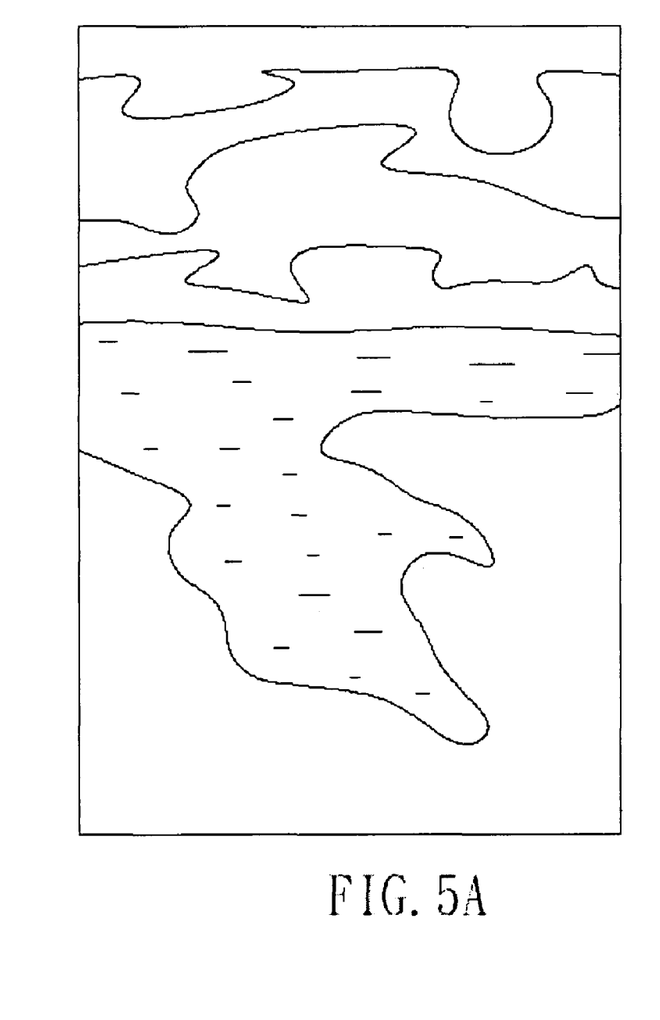
FIGS. 5A~5D are pictures of mimic image features according to the present invention.
Figure 5B:
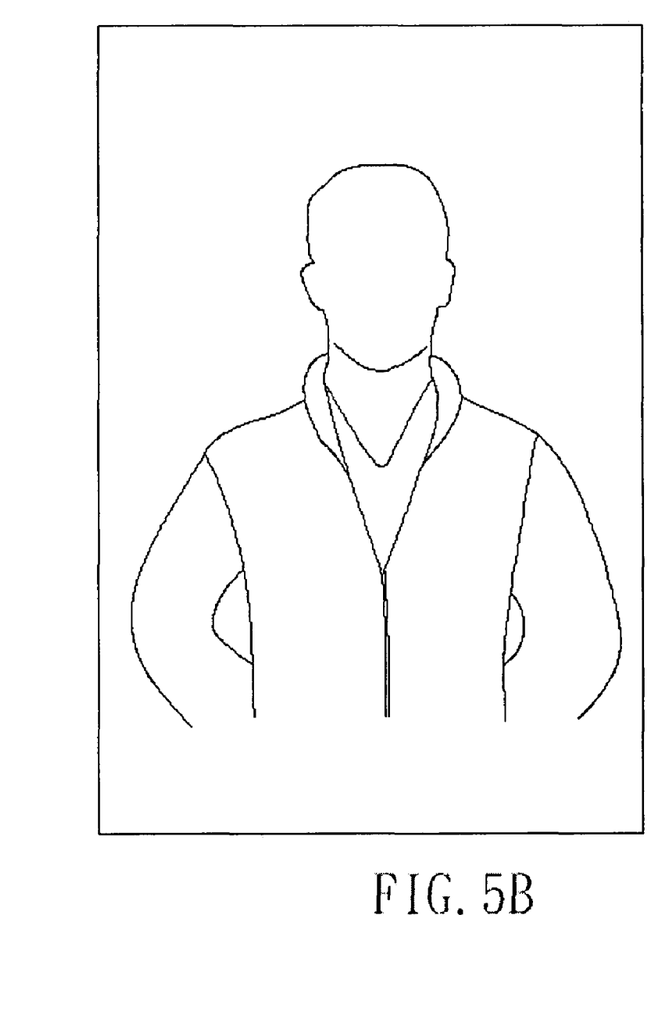
Figure 5C:
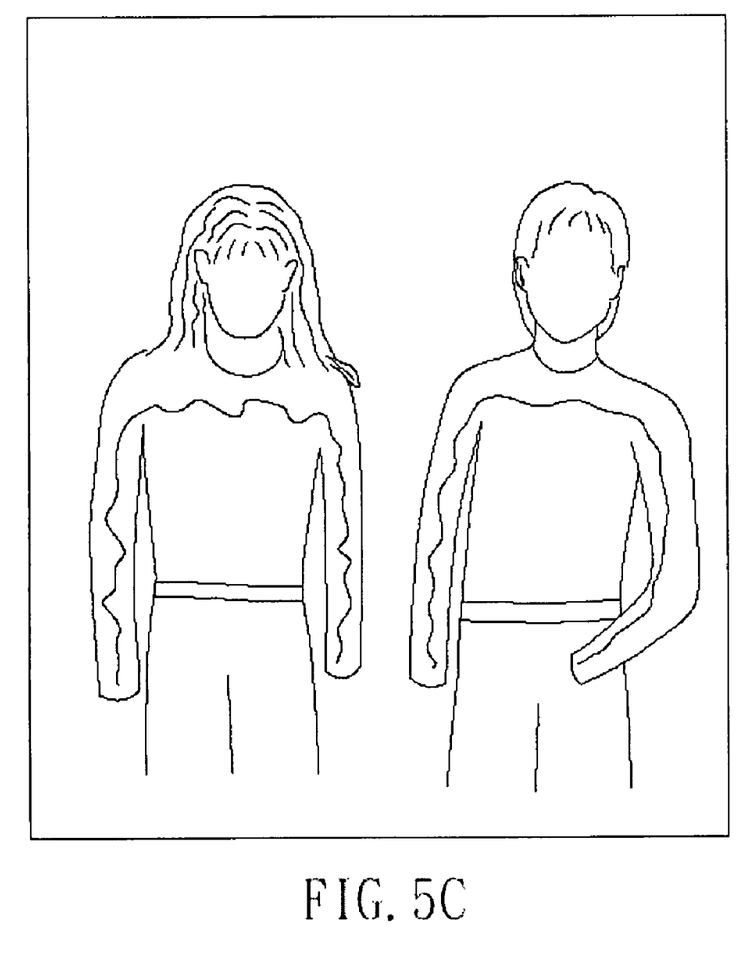
Figure 5D:
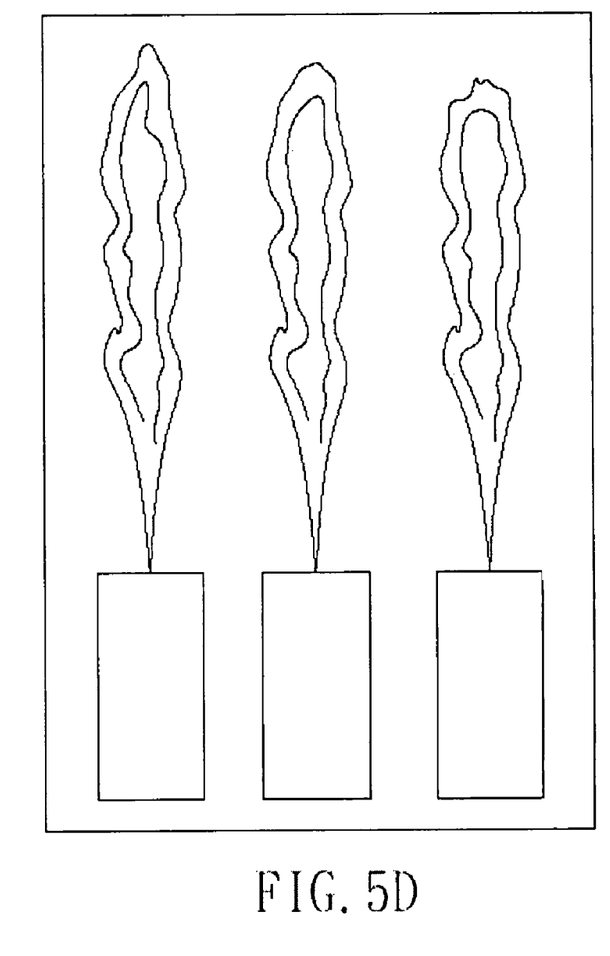
Figure 6A:
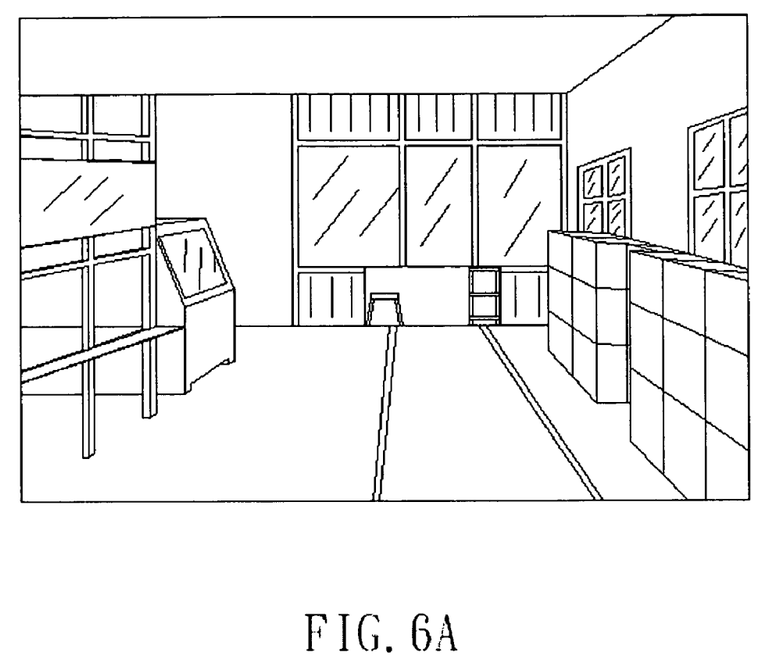
FIG. 6A~6D are pictures of alcohol fire transparent flame and alcohol fire obstructed flame obtained through a near IR dual-mode camera according to the present invention.
Figure 6B:
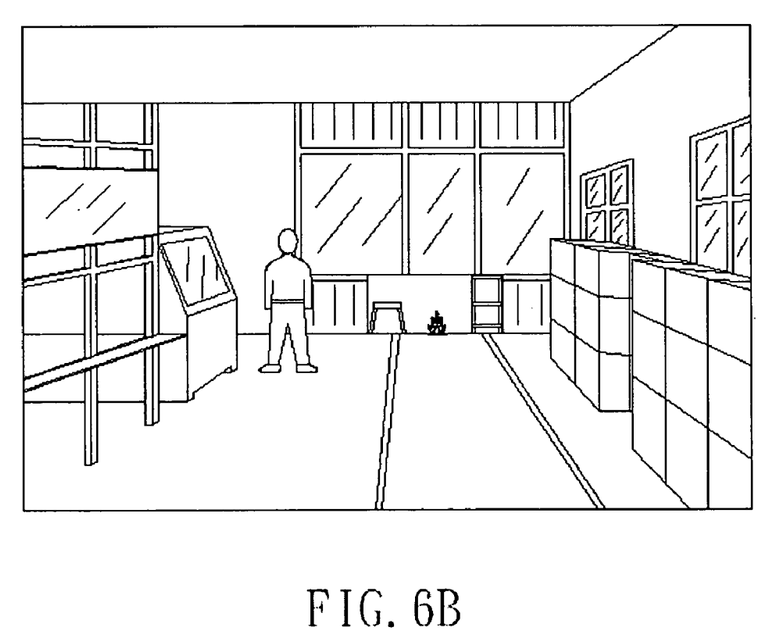
Figure 6C:
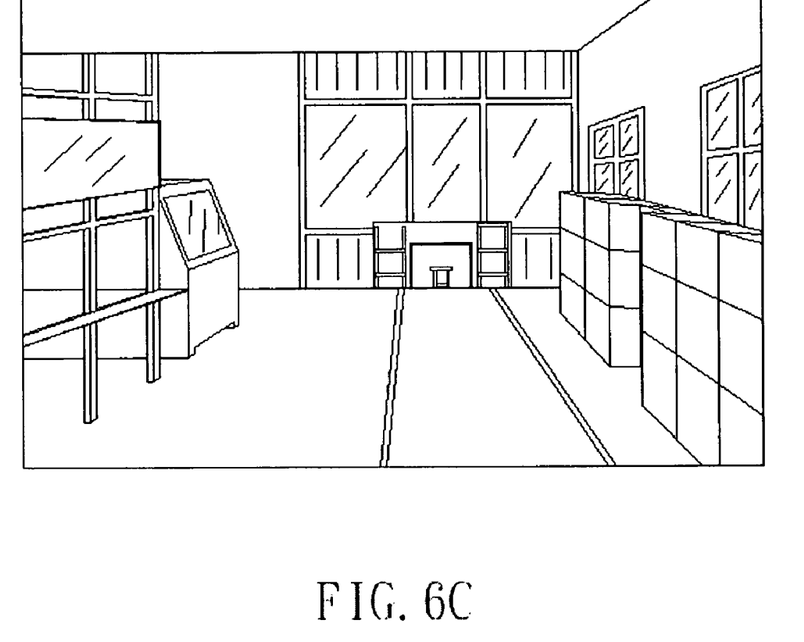
Figure 6D:
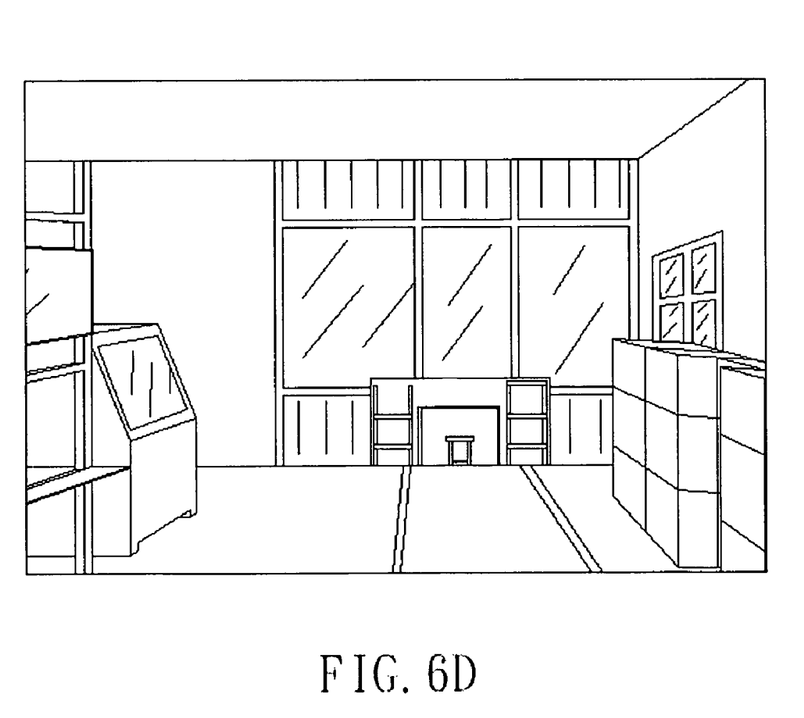

FIGS. 4A and 4B illustrate a B/W image picture (FIG. 4A) and a near IR image picture (FIG. 4B) obtained from a flame by means of the multi-wavelength dual-mode camera system. The B/W image picture covers the spectrum range 400~1200 nm, containing visible and near infrared light. The near RF image picture covers the spectrum range of 850 or 950 nm~1200 nm, mainly showing the near infrared image and eliminating the visible light image. These two image pictures commonly show flame characteristics, such as area variation characteristic, frequency characteristic, etc.

Adopting near IR images avoids common false alarms as listed in FIGS. 5A~5D, such as sunlight reflecting on wave, mimic flame features of fabrics, animals or stage flames.

FIGS. 6A~6D are flame image pictures obtained through a regular camera and a near IR dual-mode camera of the invention. A methanol or ethanol burning flame shows a blue or transparent color. It is difficult to catch the fire flame image of a methanol or ethanol burning flame. By means of using a multi-wavelength dual-mode camera system of the present invention, clear B/W and near IR image pictures of the fire flame image of a methanol or ethanol burning flame can be obtained. Therefore, the invention can detect any fire of this type.

Further, the B/W dual-mode camera and near IR dual-mode camera unit of the multi-wavelength dual-mode camera system of the present invention can effectively catch flame flicker characteristics, i.e., when the main flame is blocked, the near IR light of the flame is reflected or refracted by the surroundings onto the cameras so that the camera system effectively detects the blocked main flame, as shown in FIGS. 6A~6D. This is the problem many other techniques cannot overcome.

Figure 3:
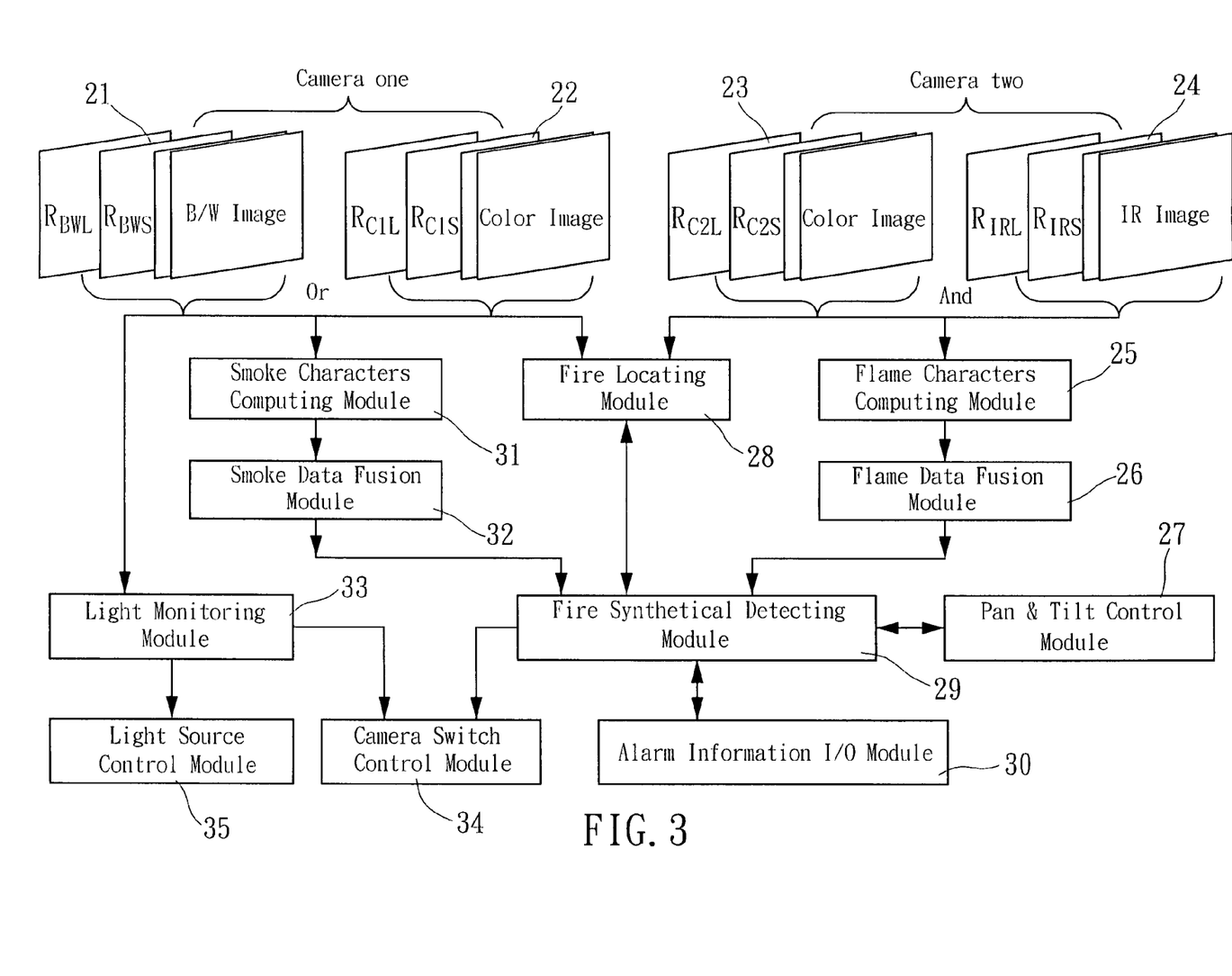
FIG. 3 is a flow chart of the mode recognition and control algorithm according to the present invention.

To reliably detect alarm, either based on the DSP DSP-based distributed type multi-wavelength video image fire detecting system or the industrial control computer-based multi-wavelength video image fire detecting system involve a complete algorithm and flow. The major data and processing flow is as shown in FIG. 3. The two different time sequence image signals of different spectrum characteristics obtained by the image capture module through the two dual-module cameras are processed through a filtering process and then processed through a fire recognition algorithm. The first step of this fire recognition algorithm is to analyze and self learn every spectrum time series image, and to update long cycle background and short cycle background so as to obtain $R_{BWL}$ long cycle background, $R_{BWS}$ long cycle background and B/W images 21, $R_{C1L}$ long cycle background, $R_{C1S}$ long cycle background and C1 series images 22, $R_{C2L}$ long cycle background, $R_{C2S}$ long cycle background and C2 series images 23, and $R_{IRL}$ long cycle background, $R_{IRS}$ long cycle background and near IR series images 24. The second step of this fire recognition algorithm is to compute back light and light distribution of the aforesaid time series images through the light monitoring module 33, and to control the light source control module 35 in starting the back light subject to the computing result, or to provide the distribution data to the fire synthetical detecting module 29, assuring switching of the second spectrum image set. The third step of this fire recognition algorithm is to compute smoke and flame related characters values by means of the smoke characters computing module 31 and the flame characters computing module 25. The fourth step of this fire recognition algorithm is to run data fusion through the smoke data fusion module 32 and the flame data fusion module 26, i.e., to run a function calculation on the computed smoke and flame character data by means of a neural network or fuzzy algorithm so as to obtain smoke and flame probability. The fifth step of this fire recognition algorithm is to make a general judgment on the data previously obtained by means of the fire synthetical detecting module 29, and to control the camera switch control module 34 in driving the two dual-mode cameras to obtain the second spectrum images so as to further obtain the fire character value and data fusion probability of the second spectrum images. This fifth step also adopts the assured flame and smoke probability parameters for fusion calculation to calculate fire general probability. To a system using a pan, the system determines the next control strategy subject to the computing result of the flame general algorithm, and the pan & tilt control module 27 controls rotation of the pan. The sixth step of this fire recognition algorithm is to position the coordinates of the fire alarmed and to indicate the location of the fire by means of the fire locating module 28, and to transmit the information of fire alarm, fire occurrence probability and fire location to a fire alarm main unit or CCTV monitoring system main unit through fire alarm input/output module 30.

The basic algorithms include flame image recognition algorithm, light source control algorithm, pan control algorithm, and dual-mode camera switching control algorithm. These algorithms are explained hereinafter:

1. Calculate field light intensity and distribution characteristics subject to the images of the color and near IR dual-mode camera 1 and the color and B/W dual-mode camera 2. When the intensity of backlight is below a predetermined threshold value, i.e., when $L_{LOW}$, the system outputs a control command to start the infrared back light source or other type of light source. When the intensity of backlight surpasses the predetermined threshold value, i.e., when $L_{NORMAL}$, the system outputs a control command to turn off the infrared back light source or other type of light source. When the intensity of back light is high or the intensity of a certain ratio of the background area is excessively high, i.e., when $L_{HIGH}$, the system algorithm controls the two dual-mode cameras to work, enabling the field image obtained through the color and near IR dual-mode camera 1 to be used as the main image sequence and the field image obtained through the color and B/W dual-mode camera 2 to be used as a supplementary image sequence.

2. To a pan system, it is necessary to calculate the installation location or the angle of rotation at every location subject to the field angle of the camera. The conversion cycle of the pan at each location can be a fixed cycle or variable cycle. The length of a fixed cycle must make sure that sufficient length series of images can be obtained for determination of fire. The control of variable cycle is subject to condition of real time analysis on every angle or predetermined location. When there is no any suspect or trend existed in the field, the algorithm outputs a newly calculated rotation cycle value to control rotation of the pan, and the rotation cycle should not less than a predetermined value P.

3. Background Update and Self-Learn Algorithm

In the image recognition algorithm, either on color, B/W or near IR image, it is necessary to learn one long cycle background $T_L$ and one short cycle background $T_S$. The length of time of the long cycle background $T_L$ is divided into several minutes or hours. The length of time of the short cycle background $T_S$ is divided into several seconds or minutes. As shown in FIG. 3, the system adopts Gauss elimination method to repeatedly update and learn the background. Subject to the background, the flame and smoke detecting algorithm runs the computation. Through the background, front field or motion object is discriminated for fire recognition.

To a system using a pan, the system runs matching and correction on the corresponding long cycle background when rotated to a predetermined angle or bit, facilitating further calculation.

Unlike conventional one single reference background technique, the invention employs one long cycle background $T_L$ and one short cycle background $T_S$ for every spectrum image. This method shows a significant effect in the fire recognition algorithm according to the present invention.

4. Smoke Recognition Algorithm

The image recognition algorithm should compare the current image to the last image or last few images for analysis, and also compare the current image to the short cycle background or long cycle background for analysis, reflecting the movement speed characteristic index $I_{SPEED}$=(change area between current image and last one or last few images)/(change area between current image and short cycle or long cycle background). This index is for smoke detection.

The algorithm divides field image into n number of equal or unequal monitoring areas, and calculates the related coefficient $R_1$, gradient variation $G_1$, saturation variation $S_1$, texture variation $T_1$ and optical flow field $F_1$ of every monitoring area, and also calculates a smoke diffusion characteristic index $I_{Disp}=f_1\{R_i, G_i, S_i, T_i, F_i, \ldots\}$.

The algorithm performs a simultaneous or time-shared calculation on the two parallel image series (color, B/W, or near IR). The two calculation results are fused into a smoke probability, i.e., $$P_{Smoke}(t)=F_1\{I_{Disp1}, I_{Move1}, I_{Disp2}, I_{Move2}\}$$

The above function relationship can be learned and calculated through a neural network, giving a smoke probability.

5. Flame Recognition Algorithm

This algorithm analyzes color video at first, calculating flame characteristics, i.e., the parameters of flicker frequency $F_{qi}$, flame area variation rate $A_i$, and long cycle and short cycle expansion rate $PR_i$, obtaining a flame characteristic index $I_{Chara1}=f_3\{Fq_i, A_i, PR_i, \ldots\}$.

This algorithm performs a secondary validation on the flame of which the color video has been analyzed. This secondary validation is to pick up series near IR images and to calculate the characteristics of the flame in the near IR images of flicker frequency $F_{qi}$, flame area variation rate $A_i$, and long cycle and short cycle expansion rate $PR_i$, obtaining a flame characteristic index $I_{Chara2}=f_3\{Fq_i, A_i, PR_i, \ldots\}$.

This algorithm analyzes flicker video of blocked fire appeared in the color, B/W or near IR image. Normally, B/W and near IR image catching is employed to pick up flicker image. The calculation of flicker frequency is 2~6 Hz. This algorithm calculates an index $I_{Freq\_}$ indicative of the flicker characteristics.

The algorithm performs a simultaneous or time-shared calculation on the two parallel image series (color, B/W, or near IR). The two calculation results are fused into a flame probability, in which, $$P_{Flame}(t) = F_2\{I_{Chara1}, I_{Chara2}, I_{Freq}\}$$

The above function relationship can be learned and calculated through a neural network, giving a smoke probability.

6. Fire General Probability Algorithm

This fire general probability algorithm integrates the aforesaid flame probability and smoke probability into a fire general probability subject to the following probability fusion method:

$$P_{f1}(t) = P_{Smoke}(t)[1 + (P_{Flame}(t) - K)]$$

$$P_{f2}(t) = P_{Flame}(t)[1 + (P_{Smoke}(t) - K)]$$

$$P_{Fire}(t) = \max\{P_{f1}(t), P_{f2}(t)\}$$

In which, $P_{Flame}(t)$ and $P_{Smoke}(t)$ are flame occurrence probability and smoke occurrence probability at time t respectively; $P_{Fire}(t)$ is the fire general probability at time t; K is the dead zone value that can be 25% or other value. The greater the dead zone value is the higher the inhibitory effect on the fire general probability of a single fire feature such as flame or smoke will be. A greater dead zone value reduces false alarm, however, it relatively lowers the sensitivity.

The objective of this fusion is to facilitate recognition of fire when both the flame and smoke features are available, raising system reaction ability and reliability relative to this kind of fire. If the flame or smoke occurrence probability is smaller than the dead zone value K, the fire general probability is inhibited. When the flame occurrence probability and the smoke occurrence probability are both greater than the dead zone value K, the fire general probability is increased rapidly.

7. Fire Positioning Algorithm

This algorithm performs a cluster analysis on the flame/smoke appeared in the field, marks the fire appeared at different locations or areas, and uses two cameras to calculate the coordinates of the location of the fire, 8. Fire Alarm Determination Conditions Fire synthetical detecting module determines warning, pre-alarm and alarm subject to the following rules:

Warning: if $P_{Smoke}(t) \geq$ Atten1 or $P_{Flame}(t) \geq$ Atten2 or $P_{Fire}(t) \geq$ Atten3

Pre-alarm: if $P_{Smoke}(t) \geq$ Warn1 or $P_{Flame}(t) \geq$ Warn2 or $P_{Fire}(t) \geq$ Warn3

Alarm: if $P_{Smoke}(t) \geq$ Alarm1 or $P_{Flame}(t) \geq$ Alarm 2 or $P_{Fire}(t) \geq$ Alarm 3 in which, Atten1, Atten2, . . . , Alarm 3 are determination threshold values.

To fit complicated environment conditions in real practice, more than 64 different detection zones can be set in the monitoring area, including high sensitivity smoke and flame detection zones, low sensitivity smoke and flame detection zones, failure detection zones and non-detection zones. Images of more than three failure detection zones assure rapid determination of field deviation and other failure conditions; any zone where there is a controlled fire is classified as a non-detection zone; for the detection of a specific zone where there is significant interface, the system sensitivity can be relatively lowered to raise the reliability; any important zone that has less interference can be set as a high sensitivity detection zone.

To a false alarm or alarm failure during application of the system of the present invention in a particular place, the system can run self-learning by means of the setting and debugging system 7 subject to the following steps: At the first step, the video image of the false alarm or alarm failure is used as a sample and inputted into the setting and debugging system 7 for calculating data fusion weight parameter; at the second step, input the obtained standard fire video images corresponding to the calculated weight parameter into the setting and debugging system 7 and check whether system response ability reaches the expected level or not, and then use the standard fire video image databank sample to run self learning and to regulate data fusion weight if the system response ability deviated from the expected level; at the third step, download the newly learned data fusion weight onto the multi-wavelength video image fire detector 12 or computer for running through one run, and for further use as a reference parameter in any similar place when checked to be correct.

The invention can also simply uses one color/NIR dual-mode camera to match with the other processing and control modules, achieving the same effects and eliminating the problems of false alarm and alarm failure.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A multi-wavelength video image fire detecting system comprised of a multi-wavelength video image fire detector, an alarm and indicate equipment, a setting and debugging system, a communication equipment, an area alarm and monitor system, and a pan & title and control system, said multi-wavelength video image fire detector being comprised of a color and near IR dual-mode camera, a color and B/W dual-mode camera, an image capture module, a processor and controller, an I/O module, a housing and a visible light and near IR view window, wherein:

said image capture module is adapted for converting analog video images into digital images and processing the digital images through a filtering process;

said processor and controller is responsible for fire recognition, switching control of said color and near IR dual-mode camera and said color and B/W dual-mode camera, pan and tilt control and back light control, and provides hovering and flying attitude adjustment controls when used in a UAV (unmanned aerial vehicle) for forest fire detection;

said I/O module comprises a plurality of hardware and software interfaces and a power supply system for system internal and external communication;

said alarm and indicate equipment is adapted for indicating pre-alarm, fire alarm, and failure;

said setting and debugging system is adapted for setting sensitivity, selection of different types of detection zones and self learning;

said communication equipment is for connection to local and remote alarm monitoring systems to upload image and fire probability and alarm information and to receive control information;

said area alarm and monitor system is adapted for monitoring remote detectors, giving control commands subject to operator's requirements, providing a secondary image fire recognition algorithm.

2. The multi-wavelength video image fire detecting system as claimed in claim 1, which utilizes system algorithms to analyze color, B/W and near IR images fire features of a fire obtained through said color and B/W dual-mode camera and said color and near IR dual-mode camera under different aperture conditions, said color, B/W and near IR images fire features of a fire including images of smoke and flame obtained under an illumination of light, images of smoke and flame obtained under a bright light condition, images of smoke and flame obtained under a dark condition, and images of a transparent flame.

3. The multi-wavelength video image fire detecting system as claimed in claim 2, wherein said color and near IR dual-mode camera utilizes a CCD or CMOS type image sensor of spectrum within 400 nm~1200 nm and a high-pass near IR filter of cut-off frequency 850 nm (or 950 nm and up) and is switchblade between a color mode and a near IR mode; said color and B/W dual-mode camera utilizes a CCD or CMOS type image sensor of spectrum within 400 nm~1200 nm and is switchblade between a color mode when at daylight or under the radiation of light and a B/W mode when under a no light or weak light environment; said color and near IR dual-mode camera is adapted for picking up flame images under different illumination conditions and flame images of burning of alcohol-like fuel and substances and flicker images of a flame; said color and B/W dual-mode camera is adapted for catching clear fire smoke images and flicker images of a flame under different illumination conditions.

4. The multi-wavelength video image fire detecting system as claimed in claim 2, wherein said color and near IR dual-mode camera and said color and B/W dual-mode camera use same or different focal distance lenses; said color and near IR dual-mode camera adopts a small aperture and a low compensation to fit a high back light condition: said color and B/W dual-mode camera adopts a great aperture and a high compensation to catch smoke motion and diffusion features under different illumination conditions.

5. The multi-wavelength video image fire detecting system as claimed in claim 2, wherein said processor and controller comprises a flame image recognition algorithm, a fire general probability algorithm a light source control algorithm, a pan control algorithm, a dual-mode camera switching control algorithm, and a fire positioning algorithm.

6. The multi-wavelength video image fire detecting system as claimed in claim 5, wherein said flame image recognition algorithm is to learn one long cycle background $T_L$ and one short cycle background $T_S$, and to compare a current image to a last image or last few images for analysis, and also to compare a current image to a short cycle background or long cycle background for analysis, obtaining an index of flame and smoke related characteristic parameter.

7. The multi-wavelength video image fire detecting system as claimed in claim 5, wherein said flame image recognition algorithm comprises a flame recognition flow and a smoke recognition flow performed simultaneously to analyze series of images obtained through said color and near IR dual-mode camera and said color and B/W dual-mode camera; to a complicated environment condition or suspected fire image, said flame image recognition algorithm drives a fire synthetical detecting module to compare and analyze second spectrum images so as to further obtain the fire character value and data fusion probability.

8. The multi-wavelength video image fire detecting system as claimed in claim 5, wherein said fire general probability algorithm integrates flame probability and smoke probability into a fire general probability subject to the probability fusion method of:

$$P_{f1}(t)=P_{Smoke}(t)[1+(P_{Flame}(t)-K)]$$

$$P_{f2}(t)=P_{Flame}(t)[1+(P_{Smoke}(t)-K)]$$

$$P_{Fire}(t)=\max\{P_{f1}(t)'P_{f2}(t)\}$$

in which, $P_{Flame}(t)$ and $P_{Smoke}(t)$ are flame occurrence probability and smoke occurrence probability at time t respectively; $P_{Fire}(t)$ is the fire general probability at time t; K is the dead zone value that can be 25% or other value.

9. The multi-wavelength video image fire detecting system as claimed in claim 5, wherein said fire synthetical detecting module determines warning, pre-alarm and alarm subject to the following rules:

Warning: if $P_{Smoke}(t) \geq$ Atten1 or $P_{Flame}(t) \geq$ Atten2 or $P_{Fire}(t) \geq$ Atten3

Pre-alarm: if $P_{Smoke}(t) \geq$ Warn1 or $P_{Flame}(t) \geq$ Warn2 or $P_{Fire}(t) \geq$ Warn3

Alarm: if $P_{Smoke}(t) \geq$ Alarm1 or $P_{Flame}(t) \geq$ Alarm 2 or $P_{Fire}(t) \geq$ Alarm 3 in which, Atten1, Atten2, . . . , Alarm 3 are determination threshold values.

10. The multi-wavelength video image fire detecting system as claimed in claim 1, wherein said processor and controller controls switching of said color and B/W dual-mode camera between the color mode and the B/W mode and said color and near IR dual-mode camera between the color mode and the near IR mode subject to the light intensity of the field being monitored to obtain optimal fire video images.

11. The multi-wavelength video image fire detecting system as claimed in claim 1, wherein said processor and controller sets the monitoring area into 64 different detection zones, including high sensitivity smoke and flame detection zones, low sensitivity smoke and flame detection zones, failure detection zones and non-detection zones so that images of more than three failure detection zones assures rapid determination of field deviation and failure conditions.

12. The multi-wavelength video image fire detecting system as claimed in claim 1, wherein said processor and controller switch on/off an infrared backlight source subject to the intensity and distribution of light in the field being monitored.

13. The multi-wavelength video image fire detecting system as claimed in claim 1, wherein said processor and controller controls rotation of pan in each requested detection zone through a routing scanning or variable scanning control, and controls the pan in position in the detection zone where a fire is suspected or recognized until elimination of the fire suspect or system reset.

14. The multi-wavelength video image fire detecting system as claimed in claim 13, wherein the pan control of said processor and controller comprises a simple control to divide the camera field angle into predetermined n number of positions and to control rotation of the pan subject to the predetermined positions, and a continuously complicated control to use an angle feedback type pan.

15. The multi-wavelength video image fire detecting system as claimed in claim 1, which analyzes color, B/W and near IF video images through a recognition algorithm procedures:

Algorithm procedure I when the intensity of back light is below a predetermined threshold value, i.e., when $L_{LOW}$, the system outputs a control command to start the infrared back light source or other type of light source; when the intensity of back light surpasses the predetermined threshold value, i.e., when $L_{NORMAL}$, the system outputs a control command to turn off the infrared back light source or other type of light source; when the intensity of back light is high or the intensity of a certain ratio of the background area is excessively high, i.e., when $L_{HIGH}$, the system algorithm controls the two dual-mode cameras to work, enabling the field image obtained through the color and near IR dual-mode camera to be used as the main image sequence and the field image obtained through the color and B/W dual-mode camera to be used as a supplementary image sequence.

Algorithm procedure II: To a pan system, it is necessary to calculate the installation location or the angle of rotation at every location subject to the field angle of the camera; the conversion cycle of the pan at each location can be a fixed cycle or variable cycle; the length of a fixed cycle must make sure that sufficient length series of images can be obtained for determination of fire; the control of variable cycle is subject to condition of real time analysis on every angle or predetermined location; then there is no any suspect or trend existed in the field, the algorithm outputs a newly calculated rotation cycle value to control rotation of the pan, and the rotation cycle should not less than a predetermined value P;

Algorithm procedure III: To a system using a pan, the system runs matching and correction on the corresponding long cycle background when rotated to a predetermined angle or bit, facilitating further calculation;

Algorithm procedure IV: In the image recognition algorithm, either on color, B/W or near IR image, it is necessary to learn one long cycle background $T_L$ and one short cycle background $T_S$; the length of time of the long cycle background $T_L$ is divided into several minutes or hours; the length of time of the short cycle background $T_S$ is divided into several seconds or minutes;

Algorithm procedure V: The image recognition algorithm should compare the current image to the last image or last few images for analysis, and also compare the current image to the short cycle background or long cycle background for analysis, reflecting the movement speed characteristic index $I_{SPEED}$=(change area between current image and last one or last few images)/(change area between current image and short cycle or long cycle background). This index is for smoke detection;

Algorithm procedure VI: The algorithm divides field image into n number of equal or unequal monitoring areas, and calculates the related coefficient $R_1$, gradient variation $G_1$, saturation variation $S_1$, texture variation $T_1$ and optical flow field $F_1$ of every monitoring area, and also calculates a smoke diffusion characteristic index $I_{Disp}=f_1\{R_i, G_i, S_i, T_i, F_i, \ldots\}$;

Algorithm procedure VII: The algorithm analyzes color video at first, calculating flame characteristics, i.e., the parameters of flicker frequency $F_{qi}$ at 2~12 Hz, flame area variation rate $A_i$, and long cycle and short cycle expansion rate $PR_i$, obtaining a flame characteristic index $I_{Chara1}=f_3\{Fq_i, A_i, PR_i, \ldots\}$;

Algorithm procedure VIII: The algorithm analyzes flicker video of blocked fire appeared in the color, B/W or near IR image. Normally, B/W and near IR image catching is employed to pick up flicker image of flicker frequency at 2~6 Hz; obtaining an index $I_{Freq\_}$ indicative of the flicker characteristics;

Algorithm procedure IX: The algorithm performs a simultaneous or time-shared calculation on the two parallel image series (color, B/W, or near IR); the two calculation results are fused into a flame probability, in which, $P_{Flame}(t)=F_2\{I_{Chara1}, I_{Chara2}, I_{Freq}\}$; and Algorithm procedure X: The algorithm performs a cluster analysis on the flame/smoke appeared in the field, marks the fire appeared at different locations or areas, and uses two cameras to calculate the coordinates of the location of the fire.

16. The multi-wavelength video image fire detecting system as claimed in claim 1, wherein the fire detection sensitivity is divided into levels 1~9, being selectable, and adjustable by setting.

17. The multi-wavelength video image fire detecting system as claimed in claim 1, wherein the alarm output of the system includes flame, smoke and fire probability, flame, smoke and fire location coordinates, fire area and location, address code of the detector in the alarmed area and other necessary information.

18. The multi-wavelength video image fire detecting system as claimed in claim 1, wherein said alarm and indicate equipment comprises a fire alarm button and a failure button operable to give an analog fire alarm signal and a failure signal to the multi-wavelength video image fire detector respectively for checking functioning of every detector signal transmission path to facilitate system maintenance.

19. The multi-wavelength video image fire detecting system as claimed in claim 1, which runs self-learning by means of said setting and debugging system subject the steps of:
  Step 1, the video image of the false alarm or alarm failure is used as a sample and inputted into said setting and debugging system for calculating data fusion weight parameter;
  Step 2, input the obtained standard fire video images corresponding to the calculated weight parameter into said setting and debugging system and check whether system response ability reaches the expected level or not, and then use the standard fire video image databank sample to run self learning and to regulate data fusion weight if the system response ability deviated from the expected level; and
  Step 3, download the newly learned data fusion weight onto said multi-wavelength video image fire detector or computer for running through one run, and for further use as a reference parameter in any similar place when checked to be correct.

20. The multi-wavelength video image fire detecting system as claimed in claim 1, wherein the system simply uses a color and near IR dual-mode camera to eliminate transparent flame, fire blocking and other false alarm and alarm failure problems.

* * * * *